United States Patent Office 3,657,312
Patented Apr. 18, 1972

3,657,312
BICYCLOALKYL PEROXYDICARBONATES
Antonio Joseph D'Angelo, Buffalo, N.Y., assignor to Pennwalt Corporation, Philadelphia, Pa.
No Drawing. Filed July 15, 1969, Ser. No. 841,999
Int. Cl. C07c 73/00, 73/10; C08f 1/60
U.S. Cl. 260—463
7 Claims

ABSTRACT OF THE DISCLOSURE

Bicycloalkyl peroxydicarbonate having the formula, where R is a bicycloalkyl radical having 4–30 carbon atoms:

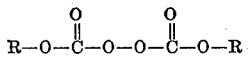

Examples are di-bornyl peroxydicarbonate and di(3-bicyclo[4.4.0]decyl) peroxydicarbonate. These peroxydicarbonates are initiators for the polymerization of monomers containing ethylenic unsaturation, such as, ethylene, vinyl chloride and allyl phthalate, to solid polymers.

BACKGROUND OF THE INVENTION

(1) Field of the invention

This invention relates to di-bicycloalkyl peroxydicarbonates and to the use of these as initiators for the polymerization of monomers containing ethylenic unsaturation to solid polymers.

(2) Description of the prior art

Dialkyl peroxydicarbonates, such as di-isopropyl peroxydicarbonate and di-n-butyl peroxydicarbonate, dicycloalkyl peroxydicarbonates, such as di-cyclohexyl peroxydicarbonate, and di-aralkyl peroxydicarbonates, such as di-benzyl peroxydicarbonate, are known. Many such compounds and methods of preparation thereof are set out in U.S. Pats. Nos. 2,370,588 and 2,464,062 and in J. Am. Chem. Soc. 72, 1254 (1950).

A serious drawback to the general use of the di-alkyl peroxydicarbonates and di-cyclohexyl peroxydicarbonates is that they must be handled, transported and stored under refrigeration. These compounds decompose rapidly at ordinary room temperatures and often decompose explosively, owing to the exothermic nature of the decomposition. In order to decrease the hazards of using these compounds, they have been used in solution in aromatic and cycloalkane solvents or in connection with free-radical traps such as iodine, phenol and nitrobenzene.

Canadian Pat. No. 765,844 discloses that 4-substituted dicyclohexyl peroxydicarbonates, such as bis(4-t-butylcyclohexyl) peroxydicarbonate, are stable at room temperatures and do not need refrigerated handling and storage facilities. (A method of preparing such compounds is disclosed.)

OBJECTS OF THE INVENTION

The principal object of this invention is a peroxydicarbonate which is reasonably stable at ordinary atmospheric temperatures so as to eliminate the need for refrigerated facilities.

Other objects of the invention will be apparent from the detailed description thereof, and from the working examples set out herein.

SUMMARY OF THE INVENTION

The bicycloalkyl peroxydicarbonates of the invention have the formula, where R is a bicycloalkyl radical having 4–30 carbon atoms:

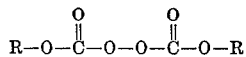

Examples of such peroxydicarbonates are: di-bornyl peroxydicarbonate, di-isobornyl peroxydicarbonate, di-norbornyl peroxydicarbonate, di(3-bicyclo[4.4.0]decyl) peroxydicarbonate, di(3-bicyclo[4.4.0]decyl peroxydicarbonate. It will be understood that in many cases, synthesis procedures will result in the product containing cis and trans isomers, and these, of course, either as separate entities or as mixtures are included in the invention.

The compounds of the invention are more stable than the di-alkyl peroxycarbonates of commerce. They are efficient initiators for the polymerization to solid polymers of monomers containing ethylenic unsaturation, which are polymerizable by the use of peroxydicarbonate initiators. Taking into account the differences in efficiency, the compounds of the invention may be substituted for the now used peroxydicarbonates in these polymerizations. (It is understood that "polymerization" as used herein includes copolymerization and like reactions.)

DESCRIPTION OF THE INVENTION AND WORKING EXAMPLES

Each R of the formula definition of the peroxydicarbonates of the invention represents a bicycloalkyl radical having 4–30 carbon atoms; this includes ring and substituent, if any, carbon atoms. Illustrative non-substituted bicycloalkyl radicals are bicyclo[1.1.0]butyl, bicyclo[1,1,1] pentyl, bicyclo[2,1,0] pentyl, and like small bicyclic rings of 4 and 5 carbon atoms, bicyclopentyl, bicyclohexyl, bicyclooctyl, bicyclodecyl (also known as decahydronaphthyl), and norbornyl. The rings may be substituted with one or more alkyl groups, preferably lower alkyl, such as methyl, ethyl, isopropyl, t-butyl, and ethylhexyl.

Of particular interest and preferred, are the peroxydicarbonates where R is derivable from a saturated bicyclic terpene. Illustrative of such saturated bicyclic terpenes are: norbornane, norpinane, norcarane, isofenchane, fenchane, thujane, santenane, pinane, carane, bornane, isobornane, and pinocamphane.

When a peroxydicarbonate of the invention having a stability at higher atmospheric temperatures of more or less indefinite duration (loosely referred to as completely stable), is desired then R should be selected to give a compound having a melting point of above about +50° C. The solid di-bicycloalkyl peroxydicarbonates of the invention are soluble in saturated hydrocarbon solvents (a requisite for ethylene polymerization). The higher melting, as defined above, are completely stable at ordinary room temperatures; they can be handled, transported and stored at temperatures on the order of +30° C. without loss in assay of the active oxygen content.

The peroxydicarbonates of the invention are useful as oxidizing agents, in the bleaching of flour, as driers for linseed, tung and soybean oils, and as providers of free-radicals for reactions requiring these. A utility of especial interest is in the polymerization of monomers containing ethylenic unsaturation (this includes the curing of unsaturated polyester resin-vinyl monomer blends).

Illustrative of such ethylenic monomers are ethylene, propylene, butadiene and isoprene; vinyl monomers, such as, vinyl chloride, vinyl acetate, vinyl stearate, ethyl acrylate and other acrylate, methyl methacrylates and other methacrylates, acrylonitriles and methacrylonitriles, acrylamide and N-substituted acrylamides, vinylidene chloride, divinyl esters such as divinyl succinate; compounds containing allyl groups such as allyl phthalate, allyl acetate, allylcarbonate. It is to be understood that the above list-

3 ing is not limiting as the peroxydicarbonates of the invention are initiators for such ethylenic compounds that are polymerizable by the use of peroxydicarbonate initiators.

EXAMPLE 1

Preparation of di-bornyl peroxydicarbonate

To 7.5 g. (0.11 mole) of 50% hydrogen peroxide, at a temperature of about +5° C., there was added 44.0 g. (0.22 mole) of 20% aqueous sodium hydroxide solution at a rate such that the reactor temperature was held at +10° C. When the addition was complete, there was added to the reactor 32.0 g. of water and 0.1 g. of a liquid alkyl aryl polyethylene glycol surfactant (Aquet Manostat Corp.), as an emulsifier. 47.2 g. (0.2 mole) of bornyl chloroformate, 91.6% assay, was added dropwise at 10° C. over a period of 10 minutes with stirring. As the addition proceeded, the temperature rose to 24° C.; the contents of the reactor were stirred for two hours at this temperature; and for another two hours at 35° C. Then the reactor contents were cooled to 10° C. and the solid peroxydicarbonate product was filtered off; washed with water until neutral; and air dried. This solid was recrystalized from pentane. The product was a white crystalline solid having a melting point of 94–96° C. which assayed 97.5% by active oxygen determination.

EXAMPLE 2

Preparation of di-isobornyl peroxydicarbonate

To 3.75 g. (0.055 mole) of 50% hydrogen peroxide, at a temperature of about +5° C. there was added 22.0 g. (0.11 mole) of 20% aqueous sodium hydroxide solution at such a rate that the reactor temperature was held at 10° C. When the addition was complete, there was added to the reactor 16.0 g. of water and 0.1 g. of nonyl phenyl polyethylene glycol ether surfactant (Tergitol NPXI Union Carbide) as an emulsifier. 21.7 g. (0.10 mole) of isobornyl chloroformate was added dropwise at 10° C. over a period of 10 minutes with stirring. As the addition proceeded, the temperature was permitted to rise to 24° C. The contents of the reactor were then stirred for 5 hours at 29° C. The product was recovered by cooling, filtering off, and recrystallized from pentane as in Example 1. The product was a white, crystalline solid melting at 95–96° C., which assayed 99.5%.

EXAMPLE 3

Preparation of di-norbornyl peroxydicarbonate

Using the procedure of Example 1, using norbornyl chloroformate as reactant, the di-norbornyl peroxydicarbonate was prepared. This is a white, crystalline solid melting at 52–54° C., which assayed 97.5%.

EXAMPLE 4

Preparation of di(3-bicyclo[4.4.0]decyl) peroxydicarbonate

To 3.75 g. (0.055 mole) of 50% hydrogen peroxide, at a temperature of about +5° C., there was added 22.0 g. (0.11 mole) of 20% aqueous sodium hydroxide. 0.1 g.

4 of Tergitol surfactant, as used in Example 2, was added. 21.9 g. (0.1 mole) of 3-bicyclo[4.4.0]decyl chloroformate, 98.8%, was added over a period of ten minutes while holding the reactor temperature at 10° C. (The chloroformate was prepared from phosgene and 3-bicyclo[4.4.0]decanol.) After the chloroformate addition, the reaction mixture was stirred for 5 hours at 24° C. The reactor content was then cooled to 10° C. A liquid layer appeared, was separated, washed with water to neutral, and dried over magnesium sulfate. The product is a clear viscous oily liquid which assayed 86.2%.

EXAMPLE 5

Stability at +30° C. and half-life determination

Half-life determinations were according to the procedure of Doehnert and Mageli, 36, No. 6, p. 142 (February 1959), Modern Plastics. The half-life of compounds of the invention and certain known compounds are listed in Table I.

Storage stability was determined by placing 30 g. of the compound in a glass jar and holding these in a 30° C. constant temperature oven. At given intervals a portion of the contents of the jar was removed and the active oxygen determined; the rate of decomposition was determined from this periodic samplings. The results of this storage test on compounds of the invention and certain known compounds are listed in Table I.

TABLE I

| Di-R peroxydicarbonate | M.P. ° C. | Half-life hours [1] | Storage stability |
|---|---|---|---|
| Isopropyl | Liquid | 5.4 | Explosive within ¼ hr. |
| n-Butyl | Liquid | 3.9 | Do. |
| Di(3-bicyclo[4.4.0]decyl) | Liquid |  | 90% decomposition in 7 days. |
| Cyclohexyl | 38–40 | 2.7 | 100% decomposition in 2 days.[2] |
| Norbornyl | 52–54 | 3.9 | No decomposition in 7 days. |
| 3,3,5-trimethylcyclohexyl |  | 5.3 | 95% decomposition in 2 days.s |
| 3,3,5-trimethylcyclohexyl |  |  | 100% decomposition in 2 dayh.[2] |
| 4-t-butylcyclohexyl | 91–92 | 5.3 | No decomposition in 2 mont[2]s. |
| Bornyl | 94–96 | 3.5 | Do.[2] |
| Isobornyl | 95–96 | 3.5 | Do.[2] |
| Benzyl | 101 |  | Do.[2] |

[1] Determined in mineral spirits at 50° C.
[2] Taken from Canadian Pat. No. 765,844.

Half-life is used in the art as a measure of the probable rate of decomposition of organic peroxides and peroxycarbonates. From the half-lifes above, it would be expected that the storage stability of di-bicycloalkyl peroxydicarbonates would be less than that of the di-alkyl and the substituted cycloalkyl peroxydicarbonates; the contrary behavior is unexpected. Even the liquid cis-trans peroxydicarbonate of the invention is definitely more stable than the solid di-cyclohexyl peroxydicarbonate. Also bornyl and isobornyl compounds of the invention show at least as good stability as the definitely longer half-life di(4 - t - butylcyclohexyl) peroxydicarbonate, which has about the same melting point.

EXAMPLE 6

Suspension polymerization of vinyl chloride

The following working examples and comparative tests are concerned with the suspension polymerization of vinyl chloride monomer to obtain solid homopolymer. It is to be understood that these examples do not limit the scope of the invention.

A standard procedure was employed as follows: 325 ml. clear "pop" bottles were used as the reactors. The test began with the addition of 125 g. of aqueous suspension medium to the bottle; the standard medium had the following composition:

|  | G. |
|---|---|
| Water, triple distilled | 105 |
| Methocel, 1% aqueous solution [1] | 10 |
| Span 60, 1% aqueous solution [2] | 10 |
| Tween 60, 1% aqueous solution [3] | 10 |

[1] Methylcellulose.
[2] Sorbitan monostearate.
[3] Polyethylene glycol ether of sorbitan monostearate.

The bottle was then held at about −20° C. until the contents were frozen. 10 g. of water was then added and frozen. Then the desired amount of peroxydicarbonate was added to the bottle. Then 50 g. of vinyl chloride monomer was added to the bottle, at about −15° C. The bottle was then crown-capped using an inert seal. The capped bottle was enclosed in a safety cage. If polymerization was not to be started immediately, the bottle was stored at low temperature to prevent polymerization.

The bottle in its safety cage was placed in a tumbling device immersed in a constant temperature bath. The bottle was tumbled at 25 revolutions per minute during the entire reaction time. Then the bottle was removed from the bath and from the cage. It was held at about 0° C. while the monomer was vented through the cap by way of a syringe needle; the venting was completed in about 15 minutes to avoid polymerization during the venting operation.

The standard procedure has been described for one bottle. However, in each test a number of bottles was prepared in order to have duplicates and also to permit the course of the reaction to be followed by removing a bottle at certain times during the total reaction time.

Some of the tests were carried out for 16 hours and others for 8 hours; all tests were at +50° C.

The number of moles of the particular peroxydicarbonate required to give 90% conversion of the vinyl chloride charged was calculated from a plot of the sample bottles. Table II gives the mole requirement for 90% conversion of the peroxydicarbonates tested.

TABLE II

| Di-R peroxydicarbonate | Mole for 8 hours [1] | Mole for 16 hours [2] |
|---|---|---|
| Bornyl | 1.39 | 6.59 |
| Isobornyl | 1.42 | |
| Norbornyl | 1.42 | |
| 4-t-butylcyclohexyl | 1.60 | |
| Isopropyl | 1.67 | |
| 3,3,5-trimethylcyclohexyl | 1.81 | |
| Benzyl | | 9.9 |

[1] Mole×10⁻⁴.
[2] Mole×10⁻⁵.

The results shown in Table II establish that compounds of the invention are more efficient initiators than any of the prior art compounds.

EXAMPLE 7

Tests in the curing of a 70-30 blend of styrene and a standard unsaturated polyester resin, using the standard S.P.I. exotherm procedure at 82° C., established that the Examples 1-3 peroxydicarbonates of this invention are at least equal in curing effectiveness to the prior art peroxydicarbonates.

I claim:
1. Bicycloalkyl peroxydicarbonate having the formula:

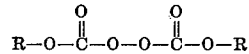

where R is a bicycloalkyl radical having 4–30 carbon atoms.

2. The peroxydicarbonate of claim 1 where said peroxydicarbonate has a melting point of about +50° C.
3. The peroxydicarbonate of claim 1 where R is derivable from a bicyclic terpene.
4. Di-bornyl peroxydicarbonate.
5. Di-isobornyl peroxydicarbonate.
6. Dn-norbornyl peroxydicarbonate.
7. Di(3-bicyclo[4.4.0]decyl)peroxydicarbonate.

References Cited
UNITED STATES PATENTS 3,499,919   3/1970   Gerritsen et al. _____ 260—463

ELBERT L. ROBERTS, Primary Examiner

D. G. RIVERS, Assistant Examiner

U.S. Cl. X.R.

99—232; 260—77.5 UA, 78.4 A, 78.4 U, 88.7 D, 89.1, 89.5 A, 89.7 R, 91.7, 92.8 W, 93.7, 94.2 R, 94.9 CD